United States Patent [19]

Goser

[11] 3,860,831

[45] Jan. 14, 1975

[54] LOGIC CIRCUIT, IN PARTICULAR A DECODER, WITH REDUNDANT ELEMENTS

[75] Inventor: Karl Goser, Muenchen, Germany

[73] Assignee: Siemens Aktiengesellschaft, Berlin and Munich, Germany

[22] Filed: Oct. 6, 1972

[21] Appl. No.: 295,584

[30] Foreign Application Priority Data

Oct. 12, 1971 Germany ........................... 2150836

[52] U.S. Cl. ................. 307/204, 307/219, 307/238, 307/304, 340/173 FF

[51] Int. Cl. ............................................ G11c 7/00

[58] Field of Search ........... 307/204, 219, 304, 303, 307/238; 340/173 SP

[56] References Cited

UNITED STATES PATENTS

| | | | |
|---|---|---|---|
| 3,500,148 | 3/1970 | Gunther et al. | 307/303 |
| 3,634,929 | 1/1972 | Yoshida et al. | 317/234 N |
| 3,665,174 | 5/1972 | Bouricius et al. | 307/219 |
| 3,721,838 | 3/1973 | Brickman et al. | 307/303 |

OTHER PUBLICATIONS

Schuster, "On-Chip Redundancy Scheme," IBM Tech. Discl. Bull., Vol. 14, No. 5, Oct. 1971 p. 1513–1514.

*Primary Examiner*—Stanley D. Miller, Jr.
*Assistant Examiner*—William D. Larkins
*Attorney, Agent, or Firm*—Hill, Gross, Simpson, Van Santen, Steadman, Chiara & Simpson

[57] ABSTRACT

A logic circuit with a redundant element is particularly characterized in that an associative memory element is additionally provided which is to electronically connect a redundant element with the logic circuit.

6 Claims, 4 Drawing Figures

LOGIC CIRCUIT, IN PARTICULAR A DECODER, WITH REDUNDANT ELEMENTS

BACKGROUND OF THE INVENTION

1. Field of the Invention

This invention relates to a logic circuit with a redundant element, and more particularly to a decoder with control lines and with a redundant element which is connected with a redundant output.

2. Description of the Prior Art

It is known per se to provide auxiliary elements as so-called redundant elements for a decoder. During production of an entire storage matrix having a large number of storage elements it is not practical to exclude the production of unusable individual storage elements. A single unusable storage element, however, would render the entire storage matrix unusable if one does not proceed to replace this faulty storage element so that it is harmless. This is achieved, according to the state of the art, in such a way that a word line with the faulty storage cell therein is separated from the decoder and a selective reserve line with a corresponding reserve storage cell is connected to a redundant output of the decoder. As has been described before in the German patent application P 17 74 109.2, the connections between the control lines of the decoder and the selective reserve line, which are to be produced, have been provided in a memory in such a way that individual electric connections are separated in the decoder and/or in the storage matrix, or at the connnection point between the decoder and the storage matrix, respectively, and other electrical connections have been connected as a replacement therefor. This separation and connection was carried out, for example, by means of burning the conductor paths and by means of applying new conductor paths through the utilization of conductive silver.

SUMMARY OF THE INVENTION

It is an object of this invention to provide techniques by which it is possible to carry out the closing of connections with redundant elements or redundant outputs, respectively, and to provide the separation of connections in a manner adapted for use with integrated circuit techniques.

The above object is achieved, according to the invention, with a logic circuit of the type stated above which is characterized in that an additional associative storage cell is provided which is to connect the redundant element with a logic circuit. Preferably, the logic circuit is a decoder whereby the storage cell provided according to the invention is connected with the redundant element and with the control lines of the decoder.

BRIEF DESCRIPTION OF THE DRAWINGS

Other objects, features and advantages of the invention, together with its organization, construction and operation will be best understood from the following detailed description of exemplary embodiments thereof taken in conjunction with the accompanying drawings, on which.

DESCRIPTION OF THE PREFERRED EMBODIMENTS

Figure 1:
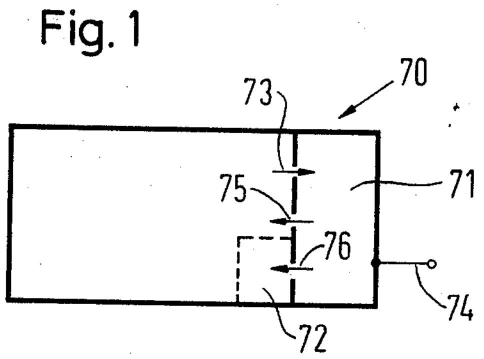
FIG. 1 is a block diagram of a logic member according to the invention having an associative storage cell.

Referring to FIG. 1, a logic circuit is referenced 70 and includes an associative storage cell referenced 71. The redundant element is designated as 72. At a junction 73 a signal will be processed to the storage cell 71 at all times when there is to be a separation of connections in the logic circuit, as will be further described below, and instead is to complete connections between the logic circuit and the redundant element 72. The storage cell includes an input 74 by way of which the signal for carrying out the above-described functions is fed in. A reference 75 is provided to indicate the passage of the signal from the storage cell into the logic circuit. This signal causes the separation of connections. The passage of a signal toward the redundant element of the logic circuit is indicated at 76. A signal at this junction causes the auxiliary connection of the redundant element to the logic circuit.

Figure 2:
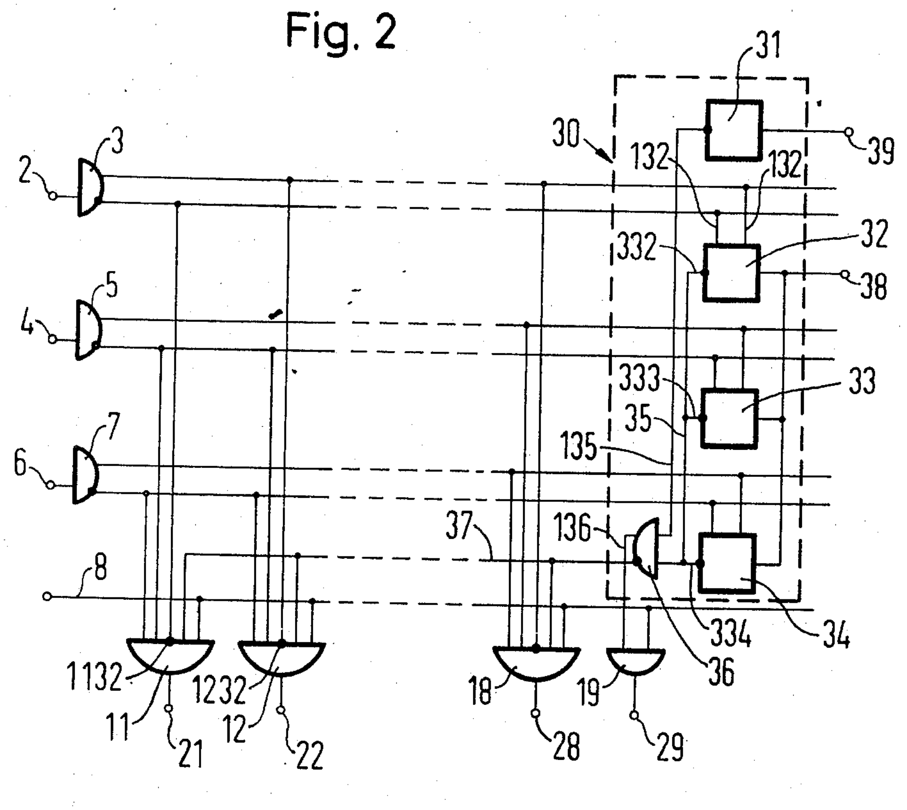
FIG. 2 illustrates the principle circuit construction of a decoder having an associative storage cell according to the principles of the invention.

The decoding device according to FIG. 2 has a plurality of address inputs 2, 4 and 6, and a further input 8 for receiving clock pulses. The inputs 2, 4 and 6 are connected to respective gates 3, 5 and 7. A plurality of AND gates at the output of the decoder are indicated by the references 11, 12 and 18, and the output of the decoder associated with these gates is indicated at the output terminals 21, 22–28. For the sake of simplicity, only three of the entire number of eight outputs with the associated AND gates are illustrated in FIG. 2. According to the invention, a further AND gate 19 having an output 29 is provided. For this purpose, one is concerned with a redundant output which is connected with the associative storage cell which is to be discussed in greater detail below. The associative storage cell itself is indicated at 30 as enclosed by a broken line. The storage cell essentially contains the three elements 32, 33 and 34, and possibly a similar element 31. The element 32 is connected by means of electrical connections 132 with the lines coming from the outputs of the gate 3. In a corresponding manner, the elements 33 and 34 are connected to the output lines of the gates 5 and 7, respectively. The output of the element 32 is referenced 332. The output 332 and the corresponding outputs 333 and 334 of the elements 33 and 34 are interconnected as is an address recognition line 35, and jointly applied to an AND gate 36, which is electrically connected with the AND gates 11–18 by way of an electrical connection line 37. A second output of the gate 36 is connected with the redundant gate 19 which has a redundant output 29. The gate 36 is connected with the element 31 of the storage cell by way of a further line 135. FIG. 1 shows to one skilled in the art the manner in which and with which function the individual connections of the gates are subdivided. The associative storage cell comprises the further inputs 38 and 39. Further additional features of the decoder, according to the invention, with an associated memory, comprising one redundant output of this exemplary embodiment, can be taken from the functions described in the following.

A word line is respectively controlled by means of signals at the inputs 2, 4 or 6 which are connected to the outputs 21–28 for the word line. If a faulty storage cell is connected to a word line in the memory, this word line must be switched off in order to allow the entire memory with the decoder to operate perfectly in spite of this fault. According to the invention, this word line with the faulty storage cell is replaced by the word line connected to the redundant output 29. As has been mentioned above, this was heretofore accomplished by providing a metallic separation of conductor paths and metallic connections of new conductor paths, according to the state of the art. According to the invention, an electric transfer is carried out instead of a mechanical transfer. For this purpose, the associative storage cell is provided, which has been described above. The principle for this operation is as follows. The address of a word line, comprising a fault, or comprising a faulty storage cell, respectively, is stored by means of putting in a unique signal by means of the connection 38 into the elements 32, 33, 34 of the storage cell. When the address of the address inputs 2, 4 and/or 6 is received which is stored in the storage cell, the storage cell becomes effective and provides the connection with the redundant output 29 of the storage cell. Furthermore, the connection of the input 2, 4 and/or 6 with the controlled regular word line of the decoder, which is usually present in the decoder, is electrically interrupted.

It is assumed that the word line of the storage matrix connected to the output 22 is to be replaced by the redundant word line at the output 29. For this reason, a signal is first of all placed on the connection 38 which causes the address of the output 22 be stored in the storage cell. If the address of the output 22 is triggered by a signal at the inputs 2, 4 and 6 the storage cell, according to the invention, will become active and its output signals at the address-recognition line 35 causes the output 22 to be switched off by way of the AND gate 36 by means of triggering the AND gate 12 and the output 29 is connected in its place by way of the AND gate 19, in particular by means of controlling from the gate 36 by way of the connection line 136.

The special sample embodiment illustrated in FIG. 2 has an associative storage cell with respect to eight outputs of the decoder comprising the elements 32, 33 and 34. Each one of these elements has two switching states so that $2^3=8$ possibilities will result for the storage cell. A storage cell comprising only the elements 32, 33 and 34 with only two switching states of an individual element, respectively, will always connect the redundant output instead of a regular output 21–28, without the provision of a signal at the input 38.

According to a further development of the invention, a further element 31 is provided in the associative storage celi. This element serves for preventing a necessary turning on of the redundant output, with the embodiment described above. Therefore, a redundant word line of the storage matrix can also be blocked. It should be noted that it must be taken into account that a production fault may also occur in the redundant word line in the same manner as it may occur in the regular word lines of the storage matrix. A signal can be fed into the connection 38 with the help of which the element 31 can be switched over between two states whereby the redundant output 29 is blocked in one of these states and, in the other state, the redundant output 29 remains ready to function in order to become effective in place of the outputs 21–28.

Figure 3:
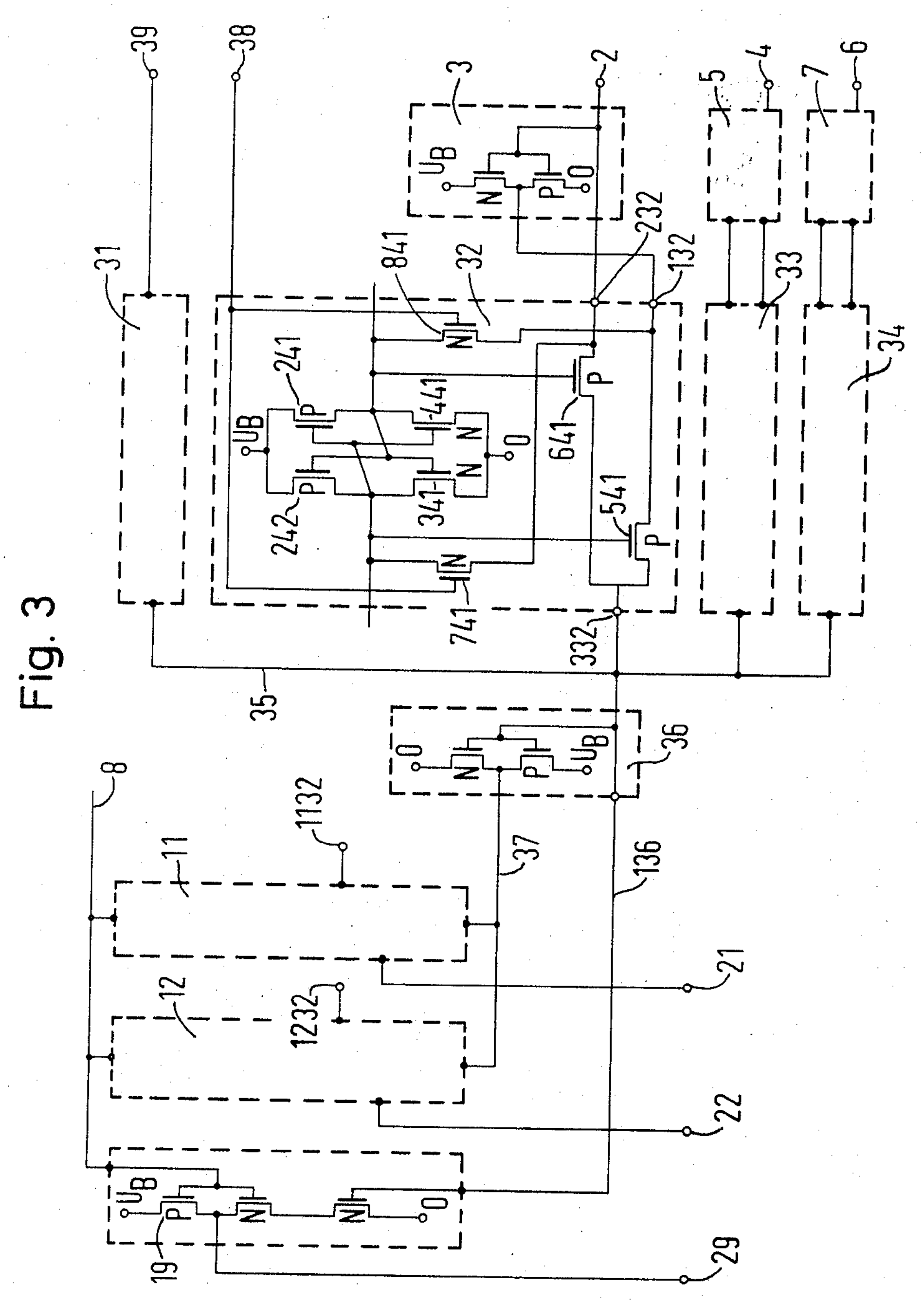
FIG. 3 is a schematic circuit diagram of a storage cell employed in practicing the present invention.

FIG. 3 illustrates a circuit diagram of the essential parts of a preferred electronic circuit for individual one of the elements 32, 33 and 34 of an associative cell according to the invention, together with such circuit parts of the decoder which are closely connected, with respect to function, with this element. The numerals employed in FIG. 3 relate, as far as they have already been employed in connection with FIG. 1, to respectively the same subject matter, for example a circuit point, an electric connection or parts of the decoder and storage cell. The explanations provided with respect to these terms in connection with FIG. 2 are also true for the circuit illustrated in FIG. 3.

A flip-flop circuit 41 is an essential component of an element of an associative storage cell according to this invention, here the element 32. The flip-flop circuit 41 essentially comprises a pair of transistors 141 and 241 and a pair of complementary transistors 341 and 441. A pair of transistors 541 and 641 are controlled by the flip-flop circuit 41. A pair of further transistors 741 and 841 permit the application of information to the flip-flop circuit. Connections 1132 and 1232 are provided, as indicated in FIG. 2 also, for the gates 11 and 12 which are connected with the outputs of the gate 3 at the input of the decoder.

If several elements are present in an associative storage cell, further circuits like the circuit of the element 32 illustrated in FIG. 3 will be connected to the address recognition line 35 as indicated in FIG. 3. The circuits of these further elements are connected with the respective gate 5, 7 at the input of the decoder. This is schematically indicated in FIG. 3 by means of the elements 33 and 34 with the gates 5 and 7 as shown in block diagram form. The element 31 with the input 39 is also shown in block diagram form.

The circuit for an associative storage cell according to the invention, which has partially schematically been illustrated in FIG. 3, in order to have a more simple and clearer view, is particularly well suited to be constructed in accordance with complementary channel MOS techniques. However, it can also be constructed in accordance with bipolar techniques and in accordance with the two conductive layer techniques. It is important that the logical circuits in the respective techniques, for the associative storage cell according to this invention, can be constructed in such a way that they operate with relatively short delay time, and therefore no great time loss will occur, and the transfer from the faulty line to the redundant element and to the redundant word line does not become noticeable as far as interfering with operation of the apparatus.

It should be pointed out that, by means of arranging several associated memory cells, according to this invention, in a decoder, correspondingly many redundant outputs can be provided for the decoder. This is of particular interest when one is required to take into account a higher failure probability in the storage matrix or in the decoder and/or when the decoder has a fairly large number of outputs. The associative storage cells may be associated in such a way that each regular output of the decoder can be associated with each redundant output.

Figure 4:
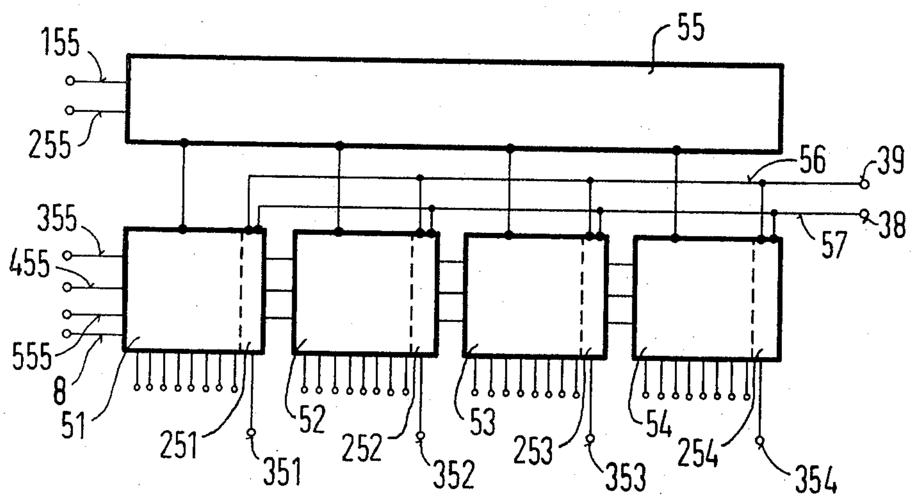
FIG. 4 is a schematic block diagram of a decoder which is subdivided into main and subdecoders.

FIG. 4 illustrates a particularly preferred further development of the invention. In FIG. 4, four decoders with associative storage cells are provided as subdecoders. Each individual one of the four decoders is constructed in accordance with the embodiment illustrated in FIG. 2. The decoders 51–54 are associated with a main decoder 55. The main decoder has the inputs 155 and 255. Together with the inputs 355, 455 and 555 a total of five inputs is provided. Due to the application of two simultaneous signals at two of these five inputs, 32 addresses can be selectively applied, these addresses being eight times the four word lines 151, 152, 153 and 154. Additional individual features are readily apparent to one skilled in the art from the principle representation of FIG. 3. (The inputs 355, 455 and 555 are common for the subdecoders 51–54).

The associative storage cells 251, 252, 253 and 254 are each connected to the lines 56 and 57 and, therefore, with the respective inputs 39 and 38. The inputs 38 and 39 in the representation of FIG. 3 are functionally identical with the inputs 38 and 39 of FIG. 1. The redundant word lines 351, 352, 353 and 354 start at the associative storage cell 251–254. The decoder, which is subdivided into main and subdecoders, according to FIG. 4 has several advantages. The effect is of particular advantage that the circuit expense is much smaller, in spite of the presence of four redundant outputs with a total of 32 regular outputs, than would be required in order to associate four associative storage cells, according to the present invention, comprising four redundant outputs, with a decoder comprising 32 outputs. However, it should be pointed out that this manner of association of decoder and associative storage cell, according to the invention, and as described hereinabove, also forms a part of the present invention.

The invention permits one to obtain an increase in the production yield during the production of semiconductor memories, in particular semiconductor memory matrices. A further advantage is provided in the fact that not only the repair time can be essentially shortened for a completed memory system, but that such repair, namely the replacement of a word line which may become unusable later, due to a fault, by means of a redundant line, can be switched off in a purely electronic manner. This is of particular interest with respect to space vehicles, and such repair can be controlled from the earth with the help of the present invention, even though the apparatus is located in space. The additional space required for circuitry, which is necessary for the associative storage cell, is not essential with respect to the advantages obtained. In particular, this space requirement is minor due to the particularly advantageous subdivision corresponding to the embodiment illustrated in FIG. 4.

Although I have described my invention by reference to certain preferred embodiments thereof, many changes and modifications may become apparent to those skilled in the art without departing from the spirit and scope of the invention. I therefore intend to include within the patent warranted hereon all such changes and modifications as may reasonably and properly be included within the scope of my contribution to the art.

I claim:

1. A logic device comprising: an output logic circuit; an input logic circuit connected to said output logic circuit for receiving signals corresponding to said output logic circuit; a redundant output logic circuit for replacing said output logic circuit when the latter becomes faulty; and an associative memory element for storing the address of said input logic circuit, said associative memory element connected to said input logic circuit, to said output logic circuit and to said redundant output logic circuit and operable only in response to the operation of said input logic circuit when said address is stored in said associative memory element to inhibit operation of said output logic circuit and effect operation of said redundant output logic circuit as a replacement for said output logic circuit.

2. A logic decoder comprising: a plurality of output logic circuits each having an address associated therewith; a plurality of input logic circuits connected to and selectively operating said plurality of output logic circuits in response to the receipt of corresponding address signals; a redundant output logic circuit; and an associative memory for storing an address corresponding to a faulty output logic circuit, said associative memory connected to said plurality of output logic circuits, to said plurality of input logic circuits and to said redundant output logic circuit and operable only in response to receipt of an address from said input logic circuits which corresponds to the stored address to inhibit operation of the corresponding output logic circuit and effect operation of said redundant output logic circuit as a replacement for an output logic circuit.

3. A decoder according to claim 2, wherein said decoder is a main decoder comprising a plurality of subdecoders each including at least one redundant output logic circuit.

4. A decoder according to claim 2, wherein said input logic circuits, said output logic circuits, said redundant output logic circuit and said associative memory are constructed as an integrated circuit.

5. A decoder according to claim 2, wherein said associative memory comprises bistable flip-flop storage circuits.

6. A decoder according to claim 2, wherein said associative memory comprises a plurality of electrically alterable bistable storage elements each including an input for receiving signals which constitute an address of an output logic circuit.

* * * * *